Patented Dec. 30, 1941

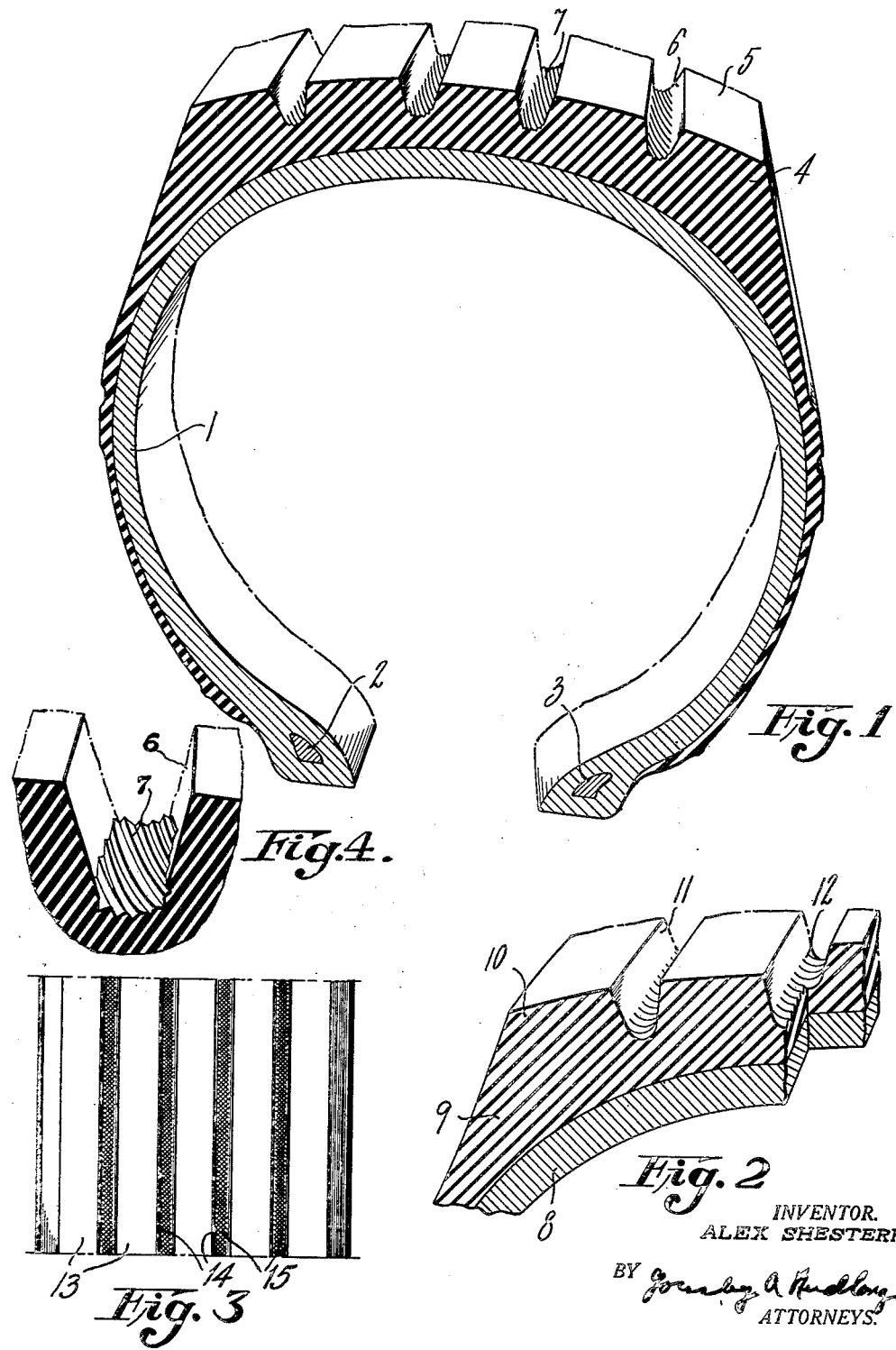

2,268,344

UNITED STATES PATENT OFFICE 2,268,344

PNEUMATIC TIRE TREAD

Alex Shesterkin, Grosse Pointe Park, Mich., assignor, by mesne assignments, to United States Rubber Company, New York, N. Y., a corporation of New Jersey Application August 18, 1938, Serial No. 225,513

4 Claims. (Cl. 152—209)

My invention relates to pneumatic tires, and in particular it relates to the formation of the rubber composition at the base of tread grooves for the purpose of reducing tread cracking. In general, the invention refers to a pneumatic tire having antiskid elements defining tread grooves, the bases of the grooves having corrugations or ridges extending in a non-parallel direction in respect to the direction of the tread grooves.

Pneumatic tires in operation are subjected to continual flexing which results in the formation of strains in the tire. In tire treads having grooves, relatively weak portions are formed with the result that tension strains are concentrated in these regions. Due to these concentrated tension strains, cracks appear in the region of each groove base. When cracks at the groove base appear, that portion of the tread becomes further weakened and the cracks become more extensive. Severe cracking at the bases of tread grooves is objectionable in that it tends to localize flexing of the tire carcass in that region, thus resulting in premature failure of the tire.

In the construction of pneumatic tires it is preferable to form the rubber composition of the tread of relatively hard stock in order to obtain good tread wear. On the other hand, relatively hard stocks are more susceptible to cracking, and as a result definite limitations are imposed on the scope of rubber compounding. Attempts have been made to prevent tread cracking by adding chemicals to the rubber compound to change some of its characteristics. However, this procedure is expensive, and the results obtained have not been satisfactory.

Small cracks at the bases of tread grooves are not particularly objectionable, but such cracks usually become more extensive following a path parallel to the direction of the grooves. In accordance with the practice of my invention, I find that by providing means for directing cracks toward the sides of the groove bases it is possible to limit the length of the cracks, and thereby overcome many of the detrimental conditions resulting from tread cracking.

Among the objects of my invention are, to reduce tread cracking in the region of the groove base, to limit the length of the tread cracks, and to obtain the benefit of reduced cracking by a simple and efficient means and without incurring any substantial manufacturing expense. These and other objects and advantages appear more fully in the following detailed description, when considered in connection with the accompanying drawing, in which:

Fig. 1 is a perspective view of a portion of a pneumatic tire in section, illustrating an embodiment of my invention;

Fig. 2 is a perspective view, in section, of a portion of a pneumatic tire, illustrating a modified form of the invention;

Fig. 3 is a plan view of a portion of a pneumatic tire, illustrating a further modification; and Fig. 4 is an enlarged view of a portion of the tire at the base of one of the tread grooves.

Referring to the drawing, and in particular to Fig. 1, I show a pneumatic tire comprising a carcass 1 of strain resisting elements, inextensible beads 2 and 3, and a tread 4 of rubber composition. The tread 4 includes a plurality of antiskid elements 5 defining grooves 6. The antiskid elements may take other conventional forms.

In most pneumatic tires having antiskid configurations the grooves 6 extend circumferentially, and it is at the bases of these grooves where cracking occurs. To overcome this condition I provide corrugations 7 in the form of V-shaped ridges formed in the rubber composition of the tread at the bases of the tread grooves. The ridges are angularly disposed relative to the circumferential path of the tread grooves. Preferably, the angle of the ridges should be of the order of 45 degrees. However, any angle substantially removed from parallel relation with the tread grooves is sufficient to deviate the course of cracks and to result in a reduction of their lengths. Preferably, the direction of the ridges should be inclined at an angle of at least 20 degrees with respect to the direction of the tread grooves.

The ridges as formed in the bases of the tread grooves are relatively small, and are spaced relatively close together. It is intended that the height of the ridges should not be more than .05 inch and that the spacing or number of the ridges should be in the order of at least 10 per inch.

Cracking at the bases of tread grooves originates at the surfaces of the groove bases. Therefore, if cracking at the surface can be prevented or reduced, ultimate tread cracking will be correspondingly affected.

The corrugations 7 are formed at the surface of the groove base, and form relatively sharp apex and base lines. Normally there is a tendency for cracks to follow a prescribed path, and such apex and base lines induce the cracks to follow parallel thereto. Therefore, instead of cracks following a circumferential path parallel to the path of the grooves, the cracks are deviated toward the sides of the grooves and toward the sides of the antiskid elements. Cracks which develop at the bases of the grooves cease to grow when they reach the sides of the antiskid elements due to the increased thickness of rubber composition in such regions.

While I have shown a preferred embodiment of my invention in the form of corrugations diagonally disposed relative to the path of the tread grooves, it is obvious that other arrangements of corrugations may be provided, resulting in improvement of the tire against tread cracking. Fig. 2 shows a modification of the invention, illustrating a tire carcass 8 and tread 9 having antiskid elements 10 defining tread grooves 11. At the bases of the tread grooves 11 are corrugations 12. In arrangement these corrugations are similar to the corrugations 7 previously described, except that the corrugations are disposed at an angle of 90 degrees relative to the path of the tread groove. While the corrugations 12 do not function to divert the path of cracks toward the sides of the antiskid elements as efficiently as the corrugations 7, yet their function is important in preventing cracking or reducing the number of cracks which originate at the surface of the groove base.

A still further modification is illustrated in Fig. 3, in which a pneumatic tire is shown having a plurality of circumferentially extending ribs 13 defining grooves 14. The bases of the grooves 14 are provided with corrugations 15 in the form of diamond shaped knurling. This type of corrugation functions to divert cracks which originate at the bases of the grooves toward either of the sidewalls of the antiskid elements which flank the bases of the tread grooves.

The various types of corrugations herein described may be formed in the tire mold by a simple knurling operation, and therefore its cost is negligible compared to the benefits derived from the practice of my invention. While the corrugations as herein described do not eliminate tread cracking entirely, they reduce the number and extent of cracks, and furthermore those cracks which do occur are not so readily apparent upon casual inspection because of their direction which is parallel to the lines of the corrugations.

While I have shown and described preferred embodiments of my invention, it is to be understood that it may be otherwise practiced except as limited by the scope of the appended claims.

Having thus described my invention, what I claim and desire to protect by Letters Patent is:

1. In a pneumatic tire, a carcass of strain resisting elements and a tread of rubber composition, said tread having grooves defining antiskid elements, and a plurality of diagonally disposed ridges formed in the rubber composition at the bases of at least some of said grooves, the number of said ridges being of the order of at least 10 per inch.

2. In a pneumatic tire, a carcass of strain resisting elements and a tread of rubber composition, said tread having grooves defining antiskid elements, and a plurality of diagonally disposed ridges formed in the rubber composition at the bases of at least some of said grooves, said ridges having a height of not more than .05 inch, and the number of said ridges being in the order of at least 10 per inch.

3. In a pneumatic tire, a carcass of strain resisting elements and a tread of rubber composition, said tread having grooves defining antiskid elements, and a plurality of diagonally disposed ridges formed in the rubber composition at the bases of at least some of said grooves, the number of said ridges being in the order of at least 10 per inch, and said ridges lying in a direction to form an angle of at least 20 degrees relative to the direction of said grooves.

4. In a pneumatic tire, a carcass of strain resisting elements and a tread of rubber composition, said tread having grooves defining antiskid elements, and a plurality of diagonally disposed ridges formed in the rubber composition at the bases of certain of said grooves, said ridges having a height of not more than .05 inch, the number of said ridges being in the order of at least 10 per inch, and said ridges lying in a direction to form an angle of at least 20 degrees relative to the direction of said grooves.

ALEX SHESTERKIN.